W. J. KIRK.
WASHER.
APPLICATION FILED JAN. 17, 1914.

1,153,232.

Patented Sept. 14, 1915.

Witnesses
Arthur W. Carlson
A. Lyda Jones.

Inventor
Walter J. Kirk
by A. Miller Belfield
Atty.

COLUMBIA PLANOGRAPH CO., WASHINGTON, D. C.

UNITED STATES PATENT OFFICE.

WALTER I. KIRK, OF CHICAGO, ILLINOIS, ASSIGNOR TO LYON & HEALY, OF CHICAGO, ILLINOIS, A CORPORATION OF ILLINOIS.

WASHER.

1,153,232.   Specification of Letters Patent.   Patented Sept. 14, 1915.

Application filed January 17, 1914. Serial No. 812,656.

*To all whom it may concern:*

Be it known that I, WALTER I. KIRK, a citizen of the United States, residing at Chicago, in the county of Cook and State of Illinois, have invented a certain new and useful Improvement in Washers, of which the following is a full, clear, concise, and exact description, reference being had to the accompanying drawings, forming a part of this specification.

My invention relates to washers or like devices, and especially to a kind of washer particularly adapted for use in connection with devices which are apt to expand, as for example the neck of a harp, which being of wood of considerable thickness is apt to expand or contract in accordance with changes in atmospheric conditions.

Prominent objects of the invention are to provide a simple and practical form of washer; to permit parts held by the washer to expand moderately without damaging effects; to permit a tight fit and clamping action to be secured notwithstanding the arrangement made to take up expansion; and to secure the foregoing and other desirable results in a simple and expeditious manner.

Figure 1:
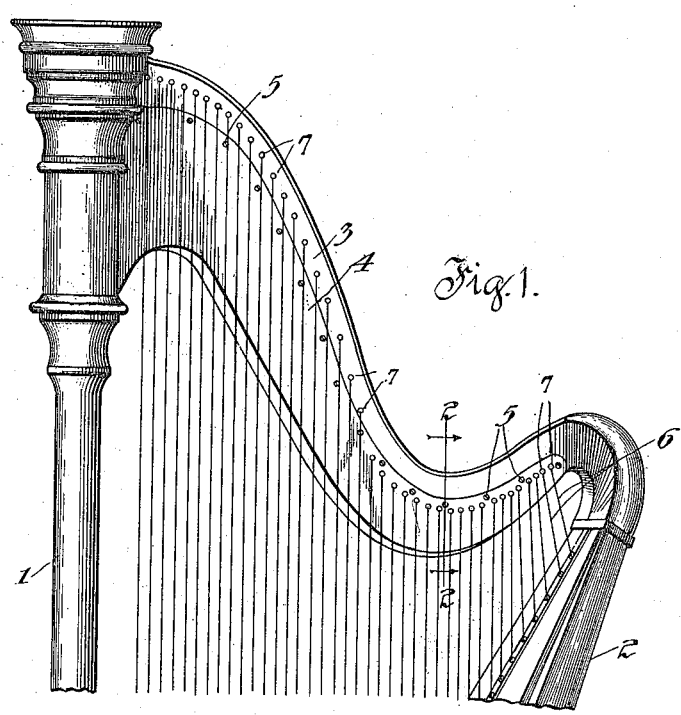
Figure 2:
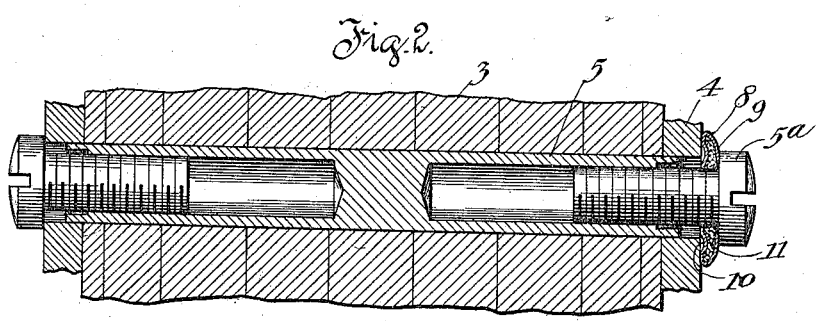
Figure 3:
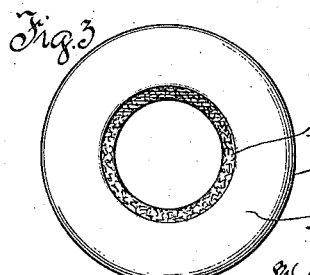

In the accompanying drawings Figure 1 is an elevation of the upper portion of a harp provided with bolts having washers embodying my invention; Fig. 2 is a cross section on line 2—2 in Fig. 1, Fig. 2 being on an enlarged scale; Fig. 3 is a plan view on a still larger scale of the washer alone.

In the drawings I show uprights 1 and 2 and neck 3 of a harp which may be of any usual or ordinary construction. The neck 3 is provided with a metallic plate 4, usually made of brass and usually called the action plate. This action plate is held in position by suitable studs or bolts 5—5, the strings 6—6 running to tuning pins 7—7. In Fig. 2 a washer 8 is shown between the head 5$^a$ of one of said bolts 5, and the plate 4. These washers 8—8 are especially made to permit transverse or crosswise expansion on the part of the wood in the neck 3, and at the same time to permit the bolt or stud to be drawn sufficiently tight to insure a tight fit and proper operation on the part of the harp. To such end the washers 8—8 are desirably constructed of a metal shell-like structure comprising a top portion 9 and a bottom portion 10 with an intermediate layer 11 of some moderately yielding preferably fabric material, such for example as woolen felt. The device is preferably made by stamping the metal shell out of a single piece of material, the felt being interposed in position in the operation. Although when shown in enlarged view as in Figs. 2 and 3 this washer seems to have a considerable amount of intermediate fabric 11, in actual practice the amount is not great but simply sufficient to allow a moderate expansion of the wood of the neck 3 without forcing off the head of the stud 5. In actual practice I have found a harp made with washers like this holding the action plate in place will remain undamaged in varying conditions of air and moisture, whereas under the same conditions the heads of screws or bolts without washers of this kind have been forced off by the expansion of the wood. Of course the size and proportions of the washers 8 may be varied according to circumstances. As shown in Figs. 2 and 3, the back wall 10 is made somewhat concave and the front wall 9 somewhat convex, whereby better adjustment and distribution will be secured as well as making further allowance for expansion of the wood of the neck.

It will be understood that changes and modifications may be made without departing from the spirit of the invention.

What I claim is:

1. A washer comprising opposing metallic members one of which is concave and the other convex, said members being connected together at their outer annular edges, but separated from one another at their inner annular edges, and an intermediate layer of yielding material interposed between said members.

2. A device of the class specified comprising a shell having a concave back wall and a convex front wall, in combination with a layer of yielding material between said walls.

3. A device of the class specified comprising a shell having a back concave wall and a front convex wall, and a layer of wool felt between said walls.

In witness whereof, I hereunto subscribe my name this 30th day of December, A. D., 1913.

WALTER I. KIRK.

Witnesses:
A. L. JONES,
H. A. JONES.

Copies of this patent may be obtained for five cents each, by addressing the "Commissioner of Patents, Washington, D. C."